Dec. 6, 1932.   A. J. MICHELIN   1,889,837
MEANS FOR SECURING REMOVABLE WHEELS TO A HUB
Filed Dec. 26, 1930
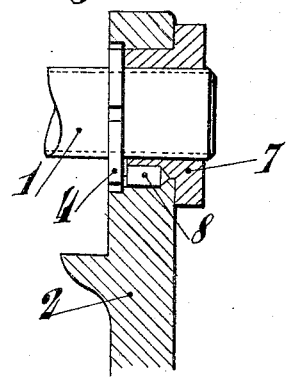
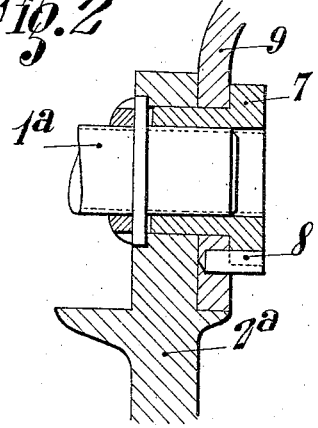 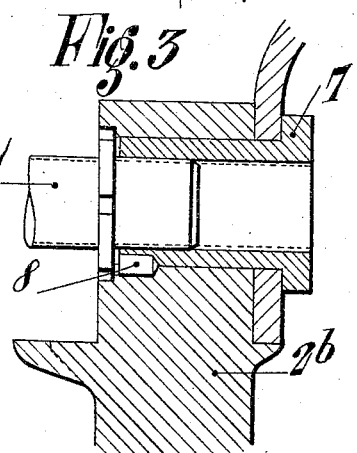
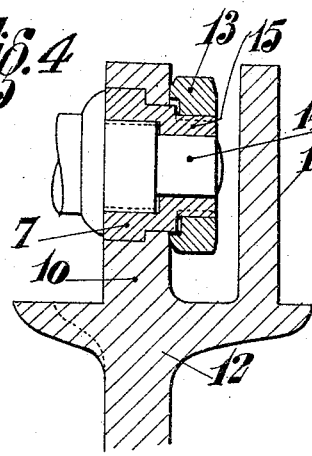 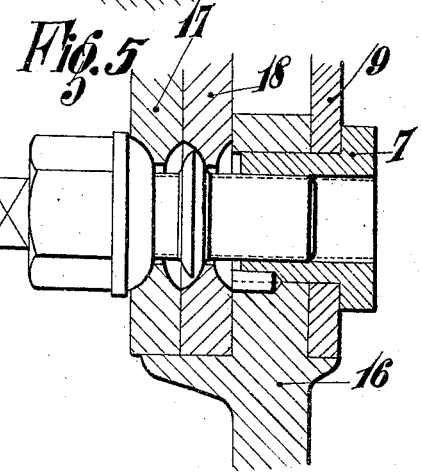
Inventor
André Jules Michelin,
By Henry Orth Watty.

Patented Dec. 6, 1932

1,889,837

UNITED STATES PATENT OFFICE

ANDRÉ JULES MICHELIN, OF PARIS, FRANCE, ASSIGNOR TO MICHELIN & CIE, OF CLERMONT-FERRAND, FRANCE, A CORPORATION OF FRANCE

MEANS FOR SECURING REMOVABLE WHEELS TO A HUB

Application filed December 26, 1930, Serial No. 504,981, and in France January 10, 1930.

My invention has for its object an improvement in the means for securing removable vehicle wheels to a hub in the case where they are secured by means of spindles passing on one hand through the wheel and on the other through a part integral with the hub. This improvement applies as well to the case of simple wheels as to that of twin wheels.

The spindles used heretofore for securing wheels to a hub are generally constituted by a rod threaded throughout its length or over a part thereof and provided with a basis adapted to bear against the outer surface of the hub flange. The spindle is secured through the agency of a nut which is screwed over its inner end. Whenever the spindle breaks, it breaks generally in the part between the basis of the spindle and the nut locking the wheel which is fitted over the outer end of the spindle. Consequently for removing and replacing the broken axis it was necessary heretofore to unscrew the nut screwed over the inner end of the spindle with a view to allowing the pulling out of the wheel with the part of the spindle remaining attached thereto. This is not always easy to perform by reason of the difficulty of reaching the inside of the hub. In most cases, it is in fact necessary to first remove the hub.

Now I remove these drawbacks according to my invention, by replacing the nut which was heretofore carried by the inner end of the spindle by an inwardly threaded ring adapted to engage a part, such as the flange of the hub, to which the wheel is secured. This ring may be secured in any suitable manner to the hub, for instance through screwing, forcing, riveting or the like. The inner end of the spindle is screwed into this ring, until its end bears against the hub flange. In order to prevent the ring from rotating while the spindle is being screwed into it, it is possible to hold it stationary in any suitable manner, for instance by means of an inner or outer stud.

It is easy to understand that if the spindle were to break in such an arrangement, it is sufficient to take hold of the basis which may be provided with notches therefor and to unscrew it while moving it outwardly. It is no longer necessary to gain access to the inside of the hub which is difficult and often impossible to achieve without removing this hub.

The method and device according to my invention should not be compared with the known mounting according to which the axis is simply screwed into the flange of the hub. As a matter of fact, this arrangement shows the serious drawback of requiring an important and very costly repair (generally the complete replacement of the hub) whenever the thread provided directly in the flange of the hub is damaged. On the contrary, in the arrangement according to my invention, the ring may be changed with the greatest ease without requiring any great expense.

Further advantages of my invention will appear from the following description of my invention.

Appended drawing shows by way of example a certain number of forms of execution which will allow my invention to be better understood.

Fig. 1 is a sectional view of part of a hub flange provided with a ring according to my invention and of part of the spindle used for securing a single wheel.

Fig. 2 is a cross-sectional view of a modification of my invention adapted for mounting twin wheels.

Fig. 3 shows the invention as applied to a very thick flange.

Fig. 4 shows it as applied to a double flange.

Fig. 5 illustrates a further application of my invention.

In Fig. 1 of the drawing the hub flange is shown at 2 and the spindle provided with its usual basis 4 at 1. The spindle is secured in this case by means of a ring 7 engaged by the flange in any suitable manner for instance through screwing, forcing, riveting or the like. Before screwing the spindle 1 in this ring, the latter is prevented from rotating with reference to the flange 2 by means of a projection or stud 8 which is caused to engage the flange and the ring from the outside of the hub.

It is apparent that if in this case, the spindle breaks to the left of the basis 4, nothing is easier than to remove it outwardly. The basis 4 may be provided to this end with suitable notches allowing an easier grip to be exerted on it.

In Fig. 2 is shown a flange 2a adapted to carry two twin wheels. This flange serves also for carrying the brake drum 9. The spindle 1a shown in Fig. 2 is provided, beyond its basis, with a washer having a special shape which serves to center the first twin wheel.

In this case as precedently the inner end of the spindle is screwed into a ring 7 according to my invention. In the example illustrated, the ring is held against rotation by a stud 8 which is caused to engage the ring from the inner side of the hub.

It is apparent in the case of Fig. 1 that the spindle passes entirely through the ring and projects slightly with reference to the inner surface of the latter.

In the case of Fig. 2, the spindle does not reach the inner surface of the ring. It is easy to understand that in both cases, the spindle is held perfectly tight. This is of particular advantage in the case where the thickness of the hub flange is considerable.

An arrangement of this type is illustrated in Fig. 3 wherein the flange 2b is very thick. In this case the ring 7 is given a suitable length whereas on the contrary the spindle 1 has the same length as in the preceding cases without any drawback arising therethrough.

This feature shows a considerable advantage owing to the fact that it allows spindles of the same length to be used whatever the thickness of the hub flange may be.

In Fig. 4, I have shown at 12 a flange of a special type. It is a double flange and comprises beyond the usual part 10, a second annular part 11. In this case, the ring 7 cannot be inserted from inside the hub as in the case of the preceding figures. Consequently the ring has to be inserted from the outside of the hub. It can be held in place through the agency of a nut 13.

In Fig. 4 is shown a spindle of a particular type which can be used with the ring according to my invention. This spindle is characterized by its smooth end 14 the diameter of which is smaller than that of the threaded part of the spindle. The ring 7 is also provided with an extension 15 the diameter of which corresponds to that of the non-threaded part of the spindle.

This manner of mounting provides a better centering of the spindle.

In Fig. 5, I have shown the manner of mounting twin wheels according to which the flange 16 is provided with the brake drum 9 and carries two twin wheels 17 and 18. The ring used according to my invention is shown at 7 and the spindle at 1.

It is easy to see that the advantages afforded by my invention are numerous. The most important are those relating to the easy removal of the spindle allowing its easy and speedy replacement. Moreover it is easy to use spindles of constant length whatever the thickness of the hub flange may be. Lastly the space available inside the brake drum is used to the utmost owing to the omission of the nuts which are replaced by a cylindrical portion of the ring, the thickness of which is very reduced. Moreover if the method of mounting according to my invention is compared with the known method of mounting consisting in simply screwing the spindle in the flange, it is apparent that the drawbacks due to normal or fortuitous wear of the thread provided in the flange or in the brake drum are reduced to a minimum.

What I claim is:

1. In a vehicle wheel, the combination of a hub flange provided with at least one hole close to its periphery, an inwardly threaded sleeve securely fitted in said hole, said sleeve projecting from the inner face of said hub flange and extending in said hole at most as far as the outer face of said hub flange, said hub flange and said sleeve being respectively provided in their contacting faces with complementary rectilinear grooves forming together a rectilinear blind hole parallel to the axis of said sleeve, and opening into the outer faces of said hub flange and sleeve, a rectilinear key adapted to fit in said hole for preventing angular displacement of said sleeve with respect to said flange, a spindle adapted to be screwed in said sleeve for fixing the wheel proper to said hub flange, and means carried by said spindle for locking said key in said hole.

2. In a vehicle wheel, the combination of a hub flange provided with at least one hole close to its periphery, an inwardly threaded sleeve securely fitted in said hole, said sleeve projecting from the inner face of said hub flange and extending in said hole at most as far as the outer face of said hub flange, said hub flange and said sleeve being respectively provided in their contacting faces with complementary semi-cylindrical grooves forming together a cylindrical blind hole parallel to the axis of said sleeve and opening into the outer faces of said hub flange and said sleeve, a cylindrical key adapted to fit in said hole for preventing angular displacement of said sleeve with respect to said flange, a spindle adapted to be screwed in said sleeve for fixing the wheel proper to said hub flange, and means carried by said spindle for locking said key in said hole.

3. In a vehicle wheel, the combination of a hub flange provided with at least one hole close to its periphery, an inwardly threaded sleeve securely fitted in said hole, said sleeve projecting from the inner face of said hub flange and extending in said hole at most as far as the outer face of said hub flange, said hub flange and said sleeve being respectively provided in their contacting faces with complementary semi-cylindrical grooves forming together a cylindrical blind hole parallel to the axis of said sleeve and opening into the outer faces of said flange and said sleeve, a cylindrical key adapted to fit in said hole for preventing angular displacement of said sleeve with respect to said flange, a spindle whose extremity is screw threaded so as to be screwed in said sleeve for fixing the wheel proper to said hub flange, and a basis on said spindle consisting of an annular collar adapted to be applied against the outer faces of said sleeve and said flange for locking said key in said hole.

In testimony that I claim the foregoing as my invention, I have signed my name.

ANDRÉ JULES MICHELIN.